Oct. 26, 1926.

J. HERMAN 1,604,163

MEANS FOR REGULATING MOTORS

Filed Sept. 5, 1923

2 Sheets-Sheet 1

INVENTOR
J. Herman
BY
ATTORNEY

Oct. 26, 1926.
J. HERMAN
1,604,163
MEANS FOR REGULATING MOTORS
Filed Sept. 5, 1923
2 Sheets-Sheet 2
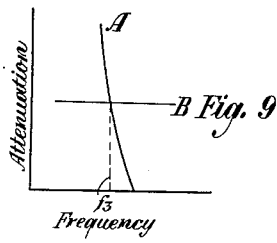
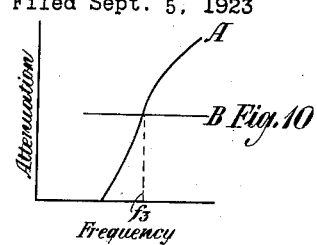
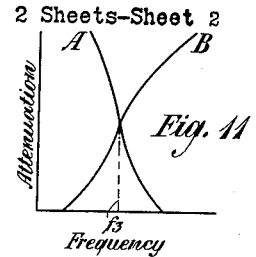
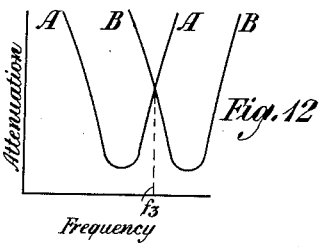
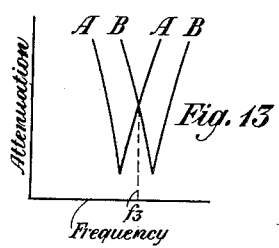
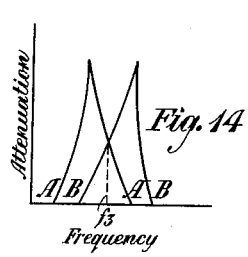
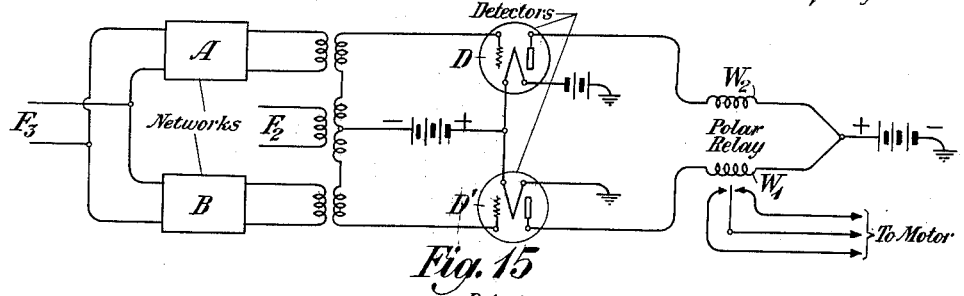
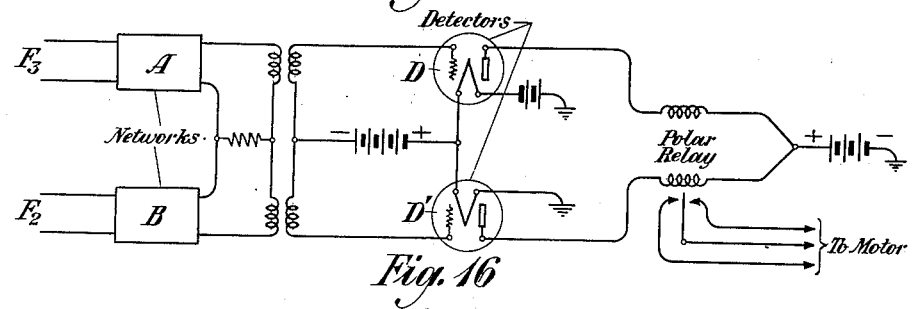
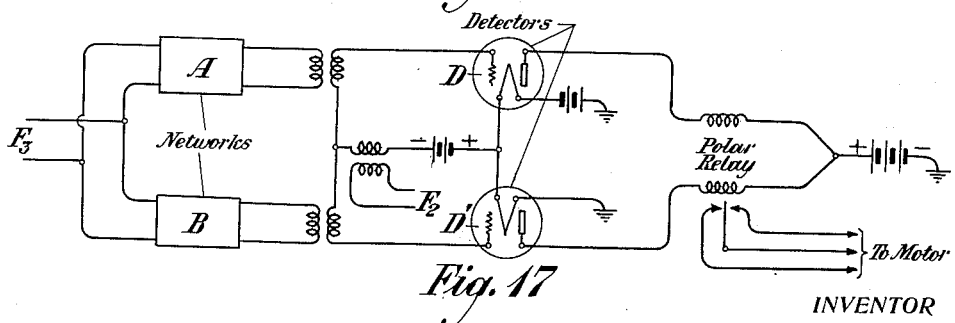
INVENTOR
J. Herman
BY
ATTORNEY Patented Oct. 26, 1926.

1,604,163

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

MEANS FOR REGULATING MOTORS.

Application filed September 5, 1923. Serial No. 661,058.

This invention relates to automatic controlling arrangements, and more particularly to arrangements for controlling the operation of electrical machinery such as motors and dynamos.

It is one of the objects of the invention to provide an automatic arrangement for governing the speed of a direct current motor. It is another object of the invention to provide an automatic arrangement for maintaining constant the frequency generated by an alternating current generator, whether the generator be of the single frequency or multi-frequency type. Another object of the invention is to provide means for controlling the speed of rotation of a motor generator set, the control being exercised through changes in the frequency generated by the set as distinguished from a control depending upon changes in potential or current.

These objects, as well as other objects of the invention, are attained by making use of the principle that a large change in the attenuation of an alternating current frequency will occur at or near the cut-off point of the filter for a small change in frequency. This change in attenuation is translated into a variation of direct current in the grid circuit of a vacuum tube detector and acts upon a relay coil connected in the detector circuit. The contacts of the relay in turn are connected to resistances in the field or armature circuits of the direct current motor which drives the generator and the action of the relay tends to maintain the speed of the motor at the proper value.

Figure 1:
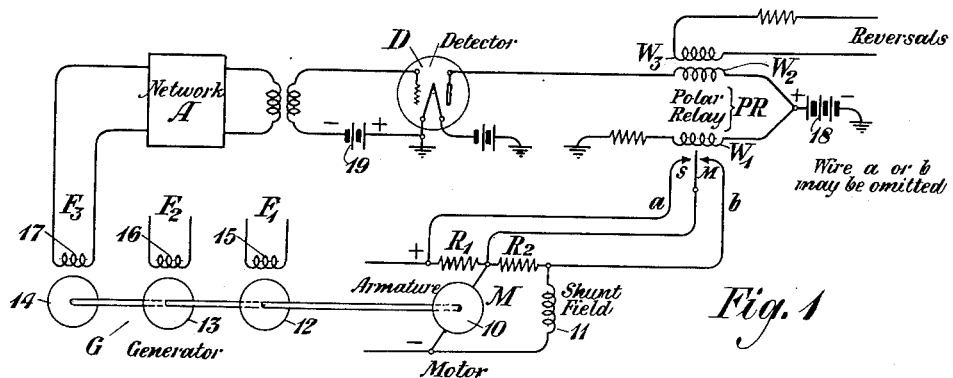
Figure 8:
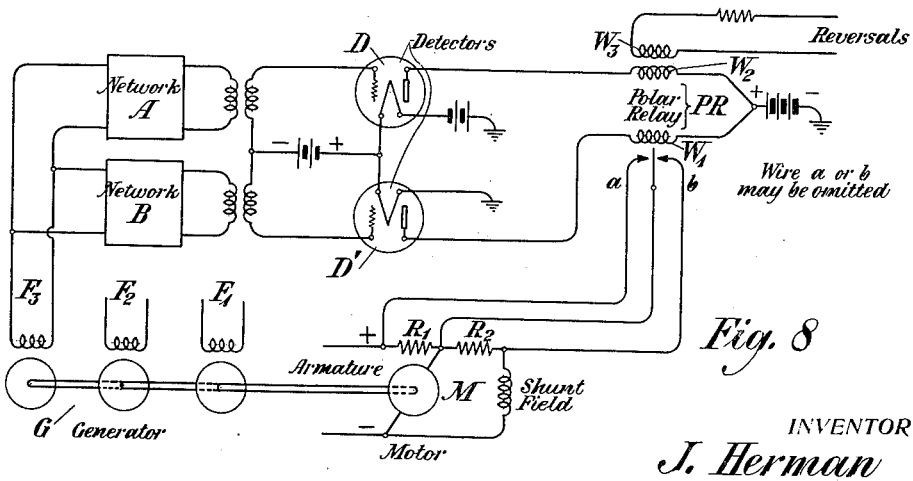

The invention may now be more fully understood from the following description when read in connection with the accompanying drawings, Figure 1 of which shows a diagram illustrating one embodiment of the invention; Figs. 2 to 7 of which are curves illustrating the operation of the apparatus of Fig. 1; Fig. 8 shows another circuit embodying the invention; Figs. 9 to 14 are curves illustrating the operation of the apparatus of Fig. 8; and Figs. 15, 16 and 17 of which show modified circuit arrangements embodying the invention.

A simple form of governing circuit is illustrated in Fig. 1. In this figure, M designates generally the motor of the motor generator set, said motor comprising an armature 10 and a field winding 11 arranged in shunt with respect to each other. A resistance $R_1$ is included in series with the armature and a resistance $R_2$ is included in series with the field winding. G designates generally the generating apparatus of the motor generator set, said generator comprising a plurality of rotors such as 12, 13 and 14 rotating in the fields of field windings such as 15, 16 and 17. The rotors may be of any type well known in the art such as, for example, toothed discs which generate frequencies in the various field windings depending upon the number of teeth in the periphery of the rotor, and also upon the peripheral speed of the rotor. In the drawing, the rotors are illustrated as generating frequencies $F_1$, $F_2$ and $F_3$ in the several field windings, these frequencies being employed as carriers in connection with a multiplex carrier transmission system, although it will be understood that the principle of the invention may be applied to any type of generator, whether generating one or more frequencies.

In order to control the speed of the motor generator and thereby the frequencies generated by the generator, one of the frequencies, for example $F_3$, is passed through a network A having a characteristic such that it produces a large change in attenuation for a small change in frequency. Various networks may be employed for this purpose, such for example, as band filters and tuned circuits, as will be discussed in more detail hereinafter. The frequency transmitted through the network A is impressed upon the grid circuit of the vacuum tube detector D. A polar relay PR is provided having three windings, $W_1$, $W_2$ and $W_3$. The windings $W_1$ and $W_2$ are connected differentially to one terminal of a source of current 18, the other terminal of the winding $W_2$ being connected to the plate of the detector, and the other terminal of the winding $W_1$ being connected to the balancing resistance. The circuit is so arranged that when the frequency $F_3$ is normal, so that the attenuation of the network A is normal, the current flowing through the winding $W_2$ will balance that flowing through the winding $W_1$. The auxiliary winding $W_3$ is connected in series with a source of current reversals such, for example, as a source of ringing current. The contact of the polar relay PR is arranged to control the motor M, and while this control may be exercised by short-circuiting a resistance in the armature circuit or field circuit or both, the contact is illustrated as alternately shortcircuiting the resistance $R_1$ in the armature circuit and the resistance $R_2$ in the field circuit as the armature of the polar relay vibrates.

Under normal conditions, the windings $W_1$ and $W_2$ being balanced, the armature of the polar relay PR swings back and forth at a uniform rate between the marking contact $m$ and the spacing contact $s$ under the control of the current in the winding $W_3$, the armature resting upon each of the contacts $m$ and $s$ for the same length of time. The resistances $R_1$ and $R_2$ are so chosen that under these conditions the vibrations of the relay, which shortcircuits them for equal lengths of time, will cause the motor to run at approximately the right speed. When running at the right speed, the frequency $F_3$ generated in the winding 17 will be such that the attenuation of the network A will produce a rectified current in the output circuit of the detector D which just balances the current flowing through the winding $W_1$.

If the speed of the motor M increases, the frequency $F_3$ will be increased. Depending upon the characteristics of the network A, the attenuation will either increase or decrease, thereby causing a corresponding change in the current flowing in the winding $W_2$ in the output circuit of the detector. This will bias the armature of the polar relay PR so that it will tend to rest upon one of the contacts $m$ or $s$ longer than the other and will thereby tend to slow down the speed of the motor.

Figure 2:
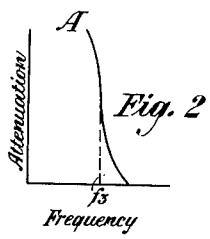

For example, let us assume that the network A is a high pass filter having the characteristics indicated by the curve of Fig. 2. The frequency $F_3$ is made to correspond in this case with the cut-off point of the filter. Since the attenuation of the network is smaller at higher frequencies, the rectified current in the winding $W_2$ becomes larger than the current in the winding $W_1$ and tends to bias the vibrations of the relay to the marking contact. This has the effect of shortcircuiting the field resistance $R_2$ for a longer period of time than the armature resistance $R_1$, and hence the speed of the motor is decreased. Obviously, the speed can only increase to a limited extent depending upon the steepness of the curve at the cut-off point and the value of the resistances $R_1$ and $R_2$. In a similar manner, if the speed decreases, the current becomes smaller in the winding $W_2$ than in the winding $W_1$ and tends to bias the relay armature to the contact $s$. This shortcircuits $R_1$ for a longer period than $R_2$ and tends to increase the speed of the motor.

Figure 3:
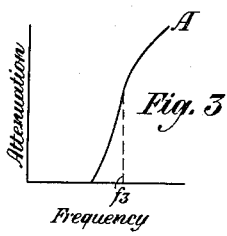
Figure 4:
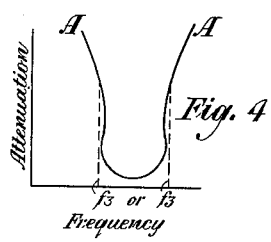
Figure 5:
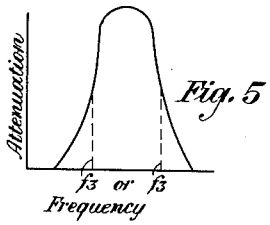
Figure 6:
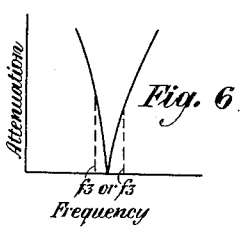
Figure 7:
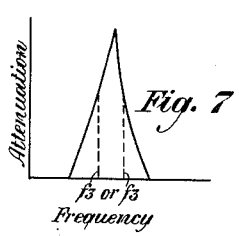

Instead of a high pass filter, the network A may be made a low pass filter having characteristics such as shown in Fig. 3. In this case, the frequency $F_3$ will also normally lie on the cut-off point of the filter but the attenuation with respect to frequency will be of a reverse order from that of Fig. 2. For this arrangement, the polar relay must either have its windings reversed or have its contacts reversed, so that a change in frequency will tend to produce the proper correcting effect upon the speed of the motor. Instead of using high or low pass filters, band pass filters having the characteristics shown in Fig. 4 or band suppression filters having the characteristics shown in Fig. 5 may be used for the network A, the normal frequency $F_3$ coinciding with either the upper or lower cut-off points of the filter depending upon the poling of the polar relay PR. Also, it will be obvious that instead of using the filters, a sharply tuned circuit having the characteristics shown in Fig. 6 may be employed, or in its stead, a sharply anti-resonant circuit having the characteristics of Fig. 7 may be utilized. In these two cases also, the normal frequency $F_3$ may be made to assume either of two positions as indicated, depending upon the manner in which the polar relay PR is poled.

The single vacuum tube arrangement illustrated in Fig. 1 is subject to the defect that the operation of the arrangement is considerably affected by changes in the C battery 19 or by changes in the voltage supplied by the generator G. This difficulty may be overcome by the arrangement shown in Fig. 8. In this figure, a second detector D' is provided in addition to the detector D, and the winding $W_1$ is supplied with rectified current from the detector D' instead of being supplied with steady current flowing through a resistance. The generated frequency $F_3$ may be supplied to the input circuits of the detecting tubes through networks A and B having characteristics described hereinafter. Obviously any change in the voltage of the B or C battery will have the same effect on both detecting tubes and will, consequently, not affect the polar relay PR. The control exercised upon the motor M by the contacts of the polar relay PR may be the same as illustrated in Fig. 1.

The operation of the arrangement shown in Fig. 8 will depend upon the character of the networks A and B. If the network B is of such character that its attenuation is constant with frequency, and the network A is a high pass filter having the characteristics illustrated in Fig. 9, the effect of the detector D' is merely to supply biasing current for the winding $W_1$ and the regulation will be effected by the change in current flowing in the winding $W_2$ exactly as in the circuit of Fig. 1. The same will hold true where the network A is a low pass filter as illustrated in Fig. 10, except that the windings or the contacts of the polar relay PR must be reversed.

It is more efficient, however, to give the network B a characteristic opposite to that of the network A, as illustrated in Figs. 11 to 14, inclusive. Any change in the frequency $F_3$ will now produce opposite effects upon the amplitudes of the rectified currents flowing in the output circuits of the two detectors. This makes the relay more sensitive to variations in speed and will cause accurate governing. In order that the characteristics of the networks A and B may be opposite, the one may be a high pass and the other a low pass filter with their cut-off characteristics crossing each other at the normal frequency $F_3$ as indicated in Fig. 11. Instead of high pass and low pass filters, the networks A and B may be band pass filters as indicated in Fig. 12, the upper cut-off characteristic of the network A crossing the lower cut-off characteristic of the network B as indicated. Also, instead of filters, two sharply tuned circuits may be used having the characteristics illustrated in Fig. 13. Conversely, two anti-resonant circuits having the characteristics illustrated in Fig. 14 may be employed.

In the circuits so far described, the normal vibrating effect of the polar relay PR is attained by supplying current reversals from some convenient source to an auxiliary winding of the polar relay. The low frequency for normally vibrating the armature of the relay may be obtained, however, by supplying two frequencies from the multi-frequency generator to the controlling apparatus. These frequencies should be very close together and so connected to the detector tubes that they produce a beat frequency in the plate circuit which causes the relay to normally vibrate at the desired rate.

One example of a circuit for this purpose is illustrated in Fig. 15, in which the frequency $F_3$ supplied from the generator passes through the networks A and B in the same manner as in Fig. 8. Another frequency $F_2$, however, is also supplied to the input circuits of the two detector tubes D and D' so that a beat frequency appears in the output circuits of the two tubes, said beat frequency corresponding to the difference between frequencies $F_2$ and $F_3$. The beat frequency flowing through the windings $W_1$ and $W_2$ of the polar relay will cause the armature of the latter to vibrate normally at the desired rate. It will be understood that any change in the speed of rotation of the generator sets will produce equal changes in the frequencies $F_2$ and $F_3$, so that the difference frequency will remain the same even though the speed of the shaft varies. The variation in the speed of the shaft will, of course, produce changes in the attenuation of the frequency $F_3$, so that a governing action will result exactly as in the case of Fig. 8.

A modified arrangement is illustrated in Fig. 16. In accordance with this circuit, the frequency $F_3$ is supplied to the detector tube D through the network A only, and the frequency $F_2$ is supplied to the detector D' through the network B. An increase in the frequencies $F_2$ and $F_3$ will increase the attenuation of the one and decrease the attenuation of the other with corresponding changes in the detected current flowing in the output circuits of the detectors D and D', thereby biasing the operation of the polar relay as described in connection with the other figures. A current component corresponding to the difference between the frequencies $F_2$ and $F_3$ will also be detected in the output circuits of the two detectors, this difference frequency causing the normal steady vibration of the polar relay.

Still another arrangement is shown in Fig. 17, this arrangement differing from that of Fig. 15 in that the frequency $F_2$ is supplied to the common branch of the two input circuits of the detectors D and D' instead of being applied serially with respect to the grids as in Fig. 15. The operation will be similar to that of circuits already described and need not be further discussed.

It will be obvious that the general principles herein disclosed may be embodied in many other organizations widely different from those illustrated without departing from the spirit of the invention as defined in the following claims.

What is claimed is:

1. A motor regulating arrangement comprising a motor to be regulated, a vibrating relay for controlling the constants of said motor, means for normally vibrating said relay at a constant frequency and without bias, means to produce an alternating current having a frequency proportional to the speed of said motor, a circuit over which said current may be transmitted, said circuit having means for producing a large change in attenuation for a small change in frequency, means to produce an operating current proportional to said attenuation, and means controlled by said current for biasing the vibrations of said relay.

2. An arrangement for maintaining constant the frequency generated by a motor generator set comprising a vibrating relay for controlling the constants of said motor, means for normally vibrating said relay at a constant frequency and without bias, a circuit over which the current generated by the generator of said set may be transmitted, said circuit having means for producing a large change in attenuation for a small change in frequency, means to produce an operating current proportional to said attenuation, and means operated by said operating current for biasing the operation of said relay.

3. An arrangement for regulating a motor comprising a motor to be regulated, a vibrating relay for controlling the constants of said motor, means for normally vibrating said relay at a constant frequency and without bias, means to produce an alternating current having a frequency proportional to the speed of said motor, a network through which said current may be transmitted, said network having an attenuation characteristic such that the attenuation varies greatly for a small change in frequency, a detector upon which the current transmitted through the network may be impressed, and means associated with said detector for biasing the operation of said vibrating relay.

4. An arrangement for maintaining constant the frequency generated by a motor generator set comprising a vibrating relay for controlling the constants of the motor of said set, means for normally vibrating said relay at a constant frequency and without bias, a network through which the current generated by the generator of said set may be transmitted, said network having an attenuation characteristic such that the attenuation varies greatly for a small change in frequency, a detector upon which the current transmitted through said network may be impressed, and means associated with the said detector for biasing the operation of said relay.

5. An arrangement for regulating the speed of a motor comprising a motor to be regulated, means to produce an alternating current having a frequency proportional to the speed of the motor, a pair of balanced detectors, means to impress said current upon said detectors, means associated with at least one of said detectors having an attenuation characteristic such that a large change in attenuation will be produced for a small change in frequency, a vibrating relay having windings in circuit with each detector, said windings being differentially connected so that, when the produced frequency is normal, the two windings will be balanced, an auxiliary winding energized by a constant frequency current, and connections controlled by the armature of said relay for adjusting the constants of the motor.

6. An arrangement for regulating the speed of a motor comprising a motor to be regulated, means to produce an alternating current having a frequency proportional to the speed of the motor, a pair of balanced detectors, means to impress said current upon said detectors, means associated with each detector having an attenuation characteristic such that a large change in attenuation will be produced for a small change in frequency, a vibrating relay having windings in circuit with each detector, said windings being differentially connected so that, when the produced frequency is normal, the two windings will be balanced, an auxiliary winding energized by a constant frequency current, and connections controlled by the armature of said relay for adjusting the constants of the motor.

7. An arrangement for maintaining constant the frequency generated by a motor generator set, said arrangement comprising a pair of balanced detectors, means to impress the current generated by the generator of said set upon said detectors, means associated with at least one of said detectors including a network having attenuation characteristics such that a large change in attenuation occurs for a small change in frequency, a regulating relay having a winding in circuit with each detector, said windings being differentially connected so that, when the generated frequency is normal, the two windings will be balanced, an auxiliary winding energized by a constant frequency current for normally vibrating the armature of said relay at a constant frequency and without bias, and means controlled by the armature of said relay for adjusting the constants of the motor of said set.

8. An arrangement for maintaining constant the frequency generated by a motor generator set, said arrangement comprising a pair of balanced detectors, means to impress the current generated by the generator of said set upon said detectors, means associated with each detector including a network having attenuation characteristics such that a large change in attenuation occurs for a small change in frequency, a regulating relay having a winding in circuit with each detector, said windings being differentially connected so that, when the generated frequency is normal, the two windings will be balanced, an auxiliary winding energized by a constant frequency current for normally vibrating the armature of said relay at a constant frequency and without bias, and means controlled by the armature of said relay for adjusting the constants of the motor of said set.

In testimony whereof, I have signed my name to this specification this 4th day of September, 1923.

JOSEPH HERMAN.